United States Patent Office 3,472,846
Patented Oct. 14, 1969

3,472,846
METHOD FOR THE PREPARATION OF CYCLIC CARBOXYLIC ACID HYDRAZIDES
Alfons Jankowski, Essen-Kray, Georg Kölling, Essen-Bredeney, and Siegfried Paulsen, Essen-Kray, Germany, assignors to Bergwerksverband GmbH, Essen, Germany
No Drawing. Filed Mar. 17, 1965, Ser. No. 440,594
Claims priority, application Germany, Mar. 25, 1964, B 76,066
Int. Cl. C07d 51/02; A01n 9/22
U.S. Cl. 260—250                                       5 Claims

ABSTRACT OF THE DISCLOSURE

Cyclic carboxylic acid hydrazides are prepared by means of employing a diazacyclopropane reacted with maleic acid, succinic acid, phthalic acid, pyromellitic acid, $\alpha,\beta$-naphthalene dicarboxylic acid or other suitable carboxylic acids. In place of the acids there may also be used the corresponding anhydrides.

---

This invention relates to the preparation of cyclic carboxylic acid hydrazides.

It is known that the preparation of cyclic acid hydrazides such as, for example, maleic acid hydrazide or phthalic hydrazide, can be carried out by reacting maleic acid or phthalic acid with a hydrazine salt. In general, the procedure followed consists of adding a carboxylic acid or the anhydride thereof to an aqueous hydrazine sulfate solution and of subsequently heating said solution with an amount of caustic soda solution equivalent to the acid constituent. However, the process has the disadvantage that substantial amounts of caustic soda solution must be used and that, moreover, the carboxylic acid hydrazides must be separated in a complicated manner from inorganic salts that are formed at the same time.

It has now been found that it is possible to avoid the above-mentioned difficulties and to prepare cyclic carboxylic acid hydrazides in a surprisingly simple manner employing a diazacyclopropane having the general formulae

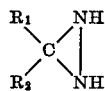

or

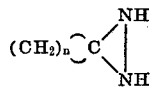

wherein $R_1$ and $R_2$ are independently selected from the group consisting of alkyl groups having one to six carbon atoms and a phenyl group and wherein $n$ is 4 or 5, said diazacyclopropane being reacted with maleic acid, succinic acid, phthalic acid, pyromellitic acid, $\alpha,\beta$-naphthalene dicarboxylic acid or other suitable carboxylic acids. Instead of using carboxylic acids, it is also possible to use their anhydrides as the starting material.

Both branched and straight chain alkyl groups, phenyl groups or a ring comprising 4–5 methylene groups may be used as substituents of the diazacyclopropanes employed as the starting products. Suitable starting products include, for example, 3 - methyl - 3 - ethyl - diazacyclopropane, 3,3-diethyl-diacyclopropane, 3-methyl-3-isopropyl-diazacyclopropane, 3-methyl-3-isobutyl - diazacyclopropane, 3-amyl-3-ethyldiazacyclopropane, 3,3-dimethyl-diazacyclopropane, 1,2-diazaspiro-(2,5)-octane, 3-phenyl-diazacyclopropane, and 3,3-dipropyl-diazacyclopropane. These three-membered ring compounds can be prepared in a simple manner according to French Patent 1,250,305.

In order to prepare the cyclic carboxylic acid hydrazides a diazacyclopropane is mixed with an aqueous solution of the carboxylic acid, whereby the respective salts of the carboxylic acid are formed. The concentration of the carboxylic acid in water is suitably between 5% by weight and the saturation concentration. This mixture is heated to temperatures ranging between about 30° and 200° C., preferably between about 50° and 100° C. This hydrolysis may also be carried out in vacuo or at pressures of up to 40 atm. Expediently, these conditions will be selected in such a manner that the ketone set free by the reaction at the same time is distilled off and that that the desired hydrazide then remains in solution. As a result of their limited solubility in water, the hydrazides can be isolated readily after the reaction solution has been cooled.

According to a preferred embodiment of the method according to the invention, it is not even necessary first to isolate the diazacyclopropanes in order to use them as starting material. On the contrary, it was found that solutions of the diazacyclopropanes obtained by the preparation thereof, and containing the corresponding ketones can be treated as such with the aqueous carboxylic acid solutions. The carboxylic acid salt of the diazacyclopropane dissolves in the aqueous phase and is thus extracted from the ketone containing solution. Subsequent heating of the solution and removal by distillation of the ketone that has formed at the same time, will produce the carboxylic acid hydrazide.

Cyclic carboxylic acid hydrazides have become increasingly important in recent times as growth control products (growth regulators). They are used, for example, to reduce the growth of grass, to prevent the sprouting of tobacco plants, as anti-germination agents in potatoes and onions, as well as growth inhibitors of bacteria. In addition, they are considered to have a strong tuberculostatic effect.

Example 1

86 parts by weight (1 mol) of 3-methyl-3-ethyl-diazacyclopropane in 200 parts by weight of water were added dropwise under stirring at 70–80° C. to a solution of 127.5 parts by weight (1.1 mol) of maleic acid in 250 parts by weight of water, and the ketone which formed by hydrolysis was simultaneously distilled off by way of a descending cooler. After the reaction was completed, the mixture was cooled, and the maleic acid hydrazide was filtered off. Yield: 105.5 parts by weight=94.2% of theoretical. Reaction:

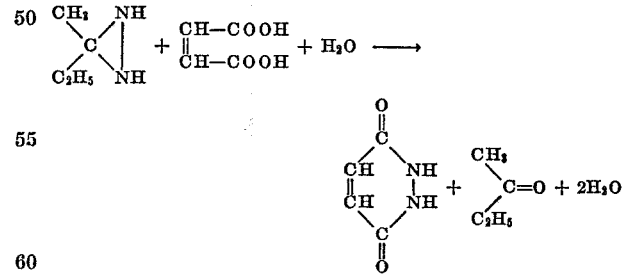

Example 2

110 parts by weight (1 mol) of 3-ethyl-3-ethyl-diacyclopropane, dissolved in 1000 parts by weight of pentanone-2, were extracted 5 times with a total of 250 parts by weight of an aqueous maleic acid solution which contained 100 parts by weight (0.86 mol) of maleic acid. After the extraction was completed, the ketone was distilled off from the aqueous phase and, after same had been cooled, 72 parts by weight of maleic acid hydrazide (78% of theoretical) were isolated. The ketone phase contained 0.75 part by weight of hydrazine.

Example 3

72 parts by weight (1 mol) of 3,3-dimethyl-diacyclopropane in 200 parts by weight of water were added dropwise under stirring at 50–60° C. to a solution of 182.5 parts by weight (1.1 mol) of phthalic acid in 2200 parts by weight of water. After this had been done, the ketone was distilled off from the hydrolysis equilibrium and the phthalic acid hydrazide was filtered off after cooling. Yield: 157 parts by weight=96.9% of theoretical

Example 4

110 parts by weight (1 mol) of 3-ethyl-3-ethyl-diacyclopropane in 200 parts by weight of water were added dropwise under stirring at 70–80° C. to a solution of 230 parts by weight (1 mol of pyromellitic acid in 500 parts by weight of water, and the ketone which formed by hydrolysis was simultaneously distilled off by way of an ascending cooler. After the reaction was completed, the mixture was cooled and the pyromellitic acid dihydrazide was filtered off. Yield: 163 parts by weight=73.5% of theoretical.

Example 5

A solution of 37.5 parts by weight of 3-methyl-3-ethyl-diazacyclopropane in 500 parts by weight of methylethyl ketone was fed over a column filled with a weak acid ion exchanger. The ketone effluent (distillate) contained only 0.9 part by weight of 3-methyl-3-ethyl-diazacyclopropane. The 3-methyl-3-ethyl-diazacyclopropane retained in the ion exchanger was extracted from the ion exchanger with 1750 parts by weight of aqueous maleic acid (150 parts by weight per liter). The aqueous phase was heated, and the ketone was distilled off. After the solution had been allowed to cool, 39.5 parts by weight of maleic acid hydrazide were distilled off; this corresponds to 82.8% of theoretical.

What is claimed is:

1. A method for the preparation of a cyclic carboxylic acid hydrazide, said method comprising mixing an aqueous solution of a diazacyclopropane of the formulae:

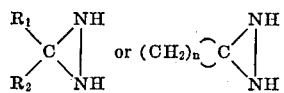

wherein $R_1$ and $R_2$ are independently selected from the group consisting of branched or straight chain alkyl groups of 1 to 6 carbon atoms and phenyl and $n$ is 4 or 5, with an aqueous solution of a dicarboxylic acid or the anhydrides thereof at a temperature of 30°–200° C.

2. A method as claimed in claim 1 wherein the temperature is 50°–100° C.

3. A method as claimed in claim 1 wherein the aqueous solution of the diazacyclopropane includes a keto-analogue of the diazacyclopropane.

4. A method as claimed in claim 1 comprising cooling the mixed aqueous solutions to precipitate the cyclic carboxylic acid hydrazide and separating the thusly precipitated cyclic carboxylic acid hydrazide.

5. A method as claimed in claim 1 wherein at least equimolar amounts of diazacyclopropane and dicarboxylic acid or anhyride thereof are mixed.

References Cited
UNITED STATES PATENTS
2,846,433  9/1952  Pennino _____ 260—250

NICHOLAS S. RIZZO, Primary Examiner

U.S. Cl. X.R.

260—999